United States Patent
Ko et al.

(10) Patent No.: US 9,639,323 B2
(45) Date of Patent: May 2, 2017

(54) AUDIO CONTROL SYSTEM AND CONTROL METHOD THEREOF

(71) Applicant: HON HAI PRECISION INDUSTRY CO., LTD., New Taipei (TW)

(72) Inventors: Chung-Nan Ko, New Taipei (TW); Chia-Chieh Cheng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/821,142

(22) Filed: Aug. 7, 2015

(65) Prior Publication Data

US 2016/0306606 A1 Oct. 20, 2016

(30) Foreign Application Priority Data

Apr. 14, 2015 (TW) .............................. 104111891 A

(51) Int. Cl.
  *B60R 16/037* (2006.01)
  *G06F 3/16* (2006.01)
  *G06F 3/0488* (2013.01)
  *G06F 3/0484* (2013.01)
  *B60H 1/00* (2006.01)

(52) U.S. Cl.
  CPC ......... *G06F 3/167* (2013.01); *B60H 1/00985* (2013.01); *B60R 16/037* (2013.01); *G06F 3/04847* (2013.01); *G06F 3/04883* (2013.01)

(58) Field of Classification Search
  None
  See application file for complete search history.

(56) References Cited

U.S. PATENT DOCUMENTS

| | | | | |
|---|---|---|---|---|
| 5,798,758 A * | 8/1998 | Harada | ............... | G06F 3/04883 715/810 |
| 5,864,105 A * | 1/1999 | Andrews | .............. | B60N 2/0228 200/5 R |
| 6,157,372 A * | 12/2000 | Blackburn | .......... | G06F 3/04883 345/157 |
| 6,438,523 B1 * | 8/2002 | Oberteuffer | ............. | G06F 3/038 382/186 |
| 6,661,406 B1 * | 12/2003 | Enoki | ................... | G06F 3/0488 345/173 |
| 7,050,606 B2 * | 5/2006 | Paul | ........................ | G06F 3/017 348/154 |

(Continued)

FOREIGN PATENT DOCUMENTS

| | | |
|---|---|---|
| CN | 103853462 A | 6/2014 |
| CN | 104216514 A | 12/2014 |
| CN | 104460974 A | 3/2015 |

*Primary Examiner* — Jonathan M Dager
(74) *Attorney, Agent, or Firm* — Steven Reiss

(57) ABSTRACT

An audio control method includes as follows. Control a vehicle to switch to an audio playing mode in response to input operations applied on a touch input unit of a vehicle. Recognize a gesture in response to input signals. Compare the gesture with a plurality of predefined gestures stored in a storage unit of the vehicle to determine whether the gesture is same as one of the plurality of predefined gestures. Obtain a control order corresponding to the one of the plurality of predefined gestures when the gesture matches the one of the plurality of predefined gestures. Control a volume of an audio player of the vehicle to increase or decrease according to the control order.

20 Claims, 11 Drawing Sheets

(56) References Cited

U.S. PATENT DOCUMENTS

| | | | |
|---|---|---|---|
| 7,084,859 B1* | 8/2006 | Pryor | G01C 21/3664 345/156 |
| 7,126,583 B1* | 10/2006 | Breed | B60K 35/00 345/158 |
| 7,158,871 B1* | 1/2007 | Ilan | G01C 21/3608 701/36 |
| 7,289,645 B2* | 10/2007 | Yamamoto | B60K 37/06 382/104 |
| 7,410,202 B2* | 8/2008 | Rose | B60R 16/005 200/61.71 |
| 7,499,569 B2* | 3/2009 | Sato | G06K 9/00832 345/156 |
| 7,693,631 B2* | 4/2010 | Yukawa | G06F 3/0482 345/156 |
| 7,834,857 B2* | 11/2010 | Prados | B60K 35/00 345/173 |
| 8,026,902 B2* | 9/2011 | Medler | G06F 3/04847 345/173 |
| 8,058,577 B2* | 11/2011 | Tissot | H01H 3/02 200/334 |
| 8,229,603 B2* | 7/2012 | Miyata | B60K 37/06 345/156 |
| 8,239,087 B2* | 8/2012 | Dybalski | B60K 35/00 345/156 |
| 8,433,481 B2* | 4/2013 | Yoshida | B60J 7/0573 296/216.01 |
| 8,564,544 B2* | 10/2013 | Jobs | G06F 3/0488 345/173 |
| 8,600,166 B2* | 12/2013 | Adhikari | G06F 3/017 382/190 |
| 8,700,262 B2* | 4/2014 | Boissonnier | B62D 1/046 701/36 |
| 8,738,224 B2* | 5/2014 | Goldman-Shenhar | B62D 1/046 701/36 |
| 8,744,645 B1* | 6/2014 | Vaghefinazari | G01C 21/3608 701/1 |
| 8,761,907 B2* | 6/2014 | Fujisawa | B60K 37/06 700/17 |
| 8,793,034 B2* | 7/2014 | Ricci | G06F 9/54 192/35 |
| 8,817,087 B2* | 8/2014 | Weng | G01C 21/3664 345/683 |
| 8,866,781 B2* | 10/2014 | Li | G06F 3/017 345/173 |
| 8,886,399 B2* | 11/2014 | El Dokor | G06F 3/017 345/158 |
| 8,886,407 B2* | 11/2014 | Sivertsen | B60K 35/00 345/173 |
| 8,949,735 B2* | 2/2015 | Ramachandran | G06F 3/0485 715/700 |
| 9,007,190 B2* | 4/2015 | Bosch | B60K 37/06 340/384.6 |
| 9,122,916 B2* | 9/2015 | Fujimura | G06K 9/44 |
| 9,142,071 B2* | 9/2015 | Ricci | H04W 48/04 |
| 9,195,633 B2* | 11/2015 | Enami | B60K 37/06 |
| 9,205,745 B2* | 12/2015 | Tissot | B60K 35/00 |
| 9,238,409 B2* | 1/2016 | Lathrop | B60K 37/06 |
| 9,261,908 B2* | 2/2016 | Weng | G06F 1/1626 |
| 9,274,619 B2* | 3/2016 | Okuyama | B62D 1/046 |
| 9,275,274 B2* | 3/2016 | Cheng | G06K 9/00355 |
| 9,292,093 B2* | 3/2016 | Iao | G06F 3/017 |
| 9,330,306 B2* | 5/2016 | Stanek | G06K 9/00375 |
| 2002/0118880 A1* | 8/2002 | Liu | G06K 9/00335 382/199 |
| 2004/0095369 A1* | 5/2004 | Takeuchi | G06F 3/0338 715/701 |
| 2004/0108993 A1* | 6/2004 | Suzuki | G06F 3/03548 345/156 |
| 2004/0122572 A1* | 6/2004 | Ichinose | B60K 35/00 701/36 |
| 2005/0021190 A1* | 1/2005 | Worrell | B60K 35/00 701/1 |
| 2005/0063564 A1* | 3/2005 | Yamamoto | B60R 25/2045 382/104 |
| 2006/0047386 A1* | 3/2006 | Kanevsky | B60K 35/00 701/36 |
| 2006/0136846 A1* | 6/2006 | Im | G06F 3/017 715/863 |
| 2007/0139374 A1* | 6/2007 | Harley | G06F 1/1626 345/157 |
| 2007/0255468 A1* | 11/2007 | Strebel | B60N 2/002 701/49 |
| 2008/0143686 A1* | 6/2008 | Yeh | B60K 37/06 345/173 |
| 2008/0243333 A1* | 10/2008 | Uchiyama | G06F 3/04883 701/36 |
| 2009/0271609 A1* | 10/2009 | Baskey | H04L 67/306 713/100 |
| 2009/0278915 A1* | 11/2009 | Kramer | G06F 3/017 348/48 |
| 2010/0050133 A1* | 2/2010 | Nishihara | G06F 3/0425 715/863 |
| 2010/0185341 A1* | 7/2010 | Wilson | B60R 25/2045 701/1 |
| 2010/0226539 A1* | 9/2010 | Ishii | G06F 3/0425 382/104 |
| 2010/0268426 A1* | 10/2010 | Pathak | G06F 3/03547 701/48 |
| 2010/0288567 A1* | 11/2010 | Bonne | B60K 37/06 178/18.01 |
| 2011/0050589 A1* | 3/2011 | Yan | B60K 37/06 345/173 |
| 2011/0169750 A1* | 7/2011 | Pivonka | B60K 35/00 345/173 |
| 2011/0220480 A1* | 9/2011 | Yorino | H01H 13/705 200/5 A |
| 2011/0286676 A1* | 11/2011 | El Dokor | G06F 3/017 382/225 |
| 2012/0068956 A1* | 3/2012 | Jira | B60K 37/06 345/174 |
| 2012/0207345 A1* | 8/2012 | Tang | G06F 3/017 382/103 |
| 2013/0135240 A1* | 5/2013 | Miller | G06F 3/014 345/173 |
| 2013/0211843 A1* | 8/2013 | Clarkson | G06F 3/04883 704/275 |
| 2013/0261871 A1* | 10/2013 | Hobbs | B60K 37/06 701/28 |
| 2014/0222298 A1* | 8/2014 | Gurin | B60W 50/085 701/49 |
| 2015/0131857 A1* | 5/2015 | Han | G06K 9/00845 382/103 |
| 2015/0175172 A1* | 6/2015 | Truong | B60W 50/10 701/36 |
| 2016/0039429 A1* | 2/2016 | Abou-Nasr | B60W 50/10 382/103 |
| 2016/0274669 A1* | 9/2016 | Hsiao | B60K 11/04 |

* cited by examiner

AUDIO CONTROL SYSTEM AND CONTROL METHOD THEREOF

CROSS-REFERENCE TO RELATED APPLICATIONS

The application is related to co-pending application Ser. No. 14/821,120, entitled, "WINDOW CONTROL SYSTEM AND CONTROL METHOD THEREOF", by CHUNG-NAN KO and CHIA-CHIEH CHENG, Ser. No. 14/821,131, entitled, "AIR CONDITIONER CONTROL SYSTEM AND CONTROL METHOD THEREOF", by CHUNG-NAN KO and CHIA-CHIEH CHENG. Such applications have the same assignee as the instant application and are concurrently filed herewith. The disclosure of the above-identified applications is incorporated herein by reference.

FIELD

The subject matter herein generally relates to vehicle control systems and control methods thereof, especially to a vehicle control system and a vehicle control method thereof for controlling auxiliary systems of a vehicle such as audio playing system.

BACKGROUND

Traditional audio playing systems are mostly controlled by mechanical key installed in the vehicle. When the user wants to adjust the volume of the audio playback system, the user must rotate or slide the mechanical key.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
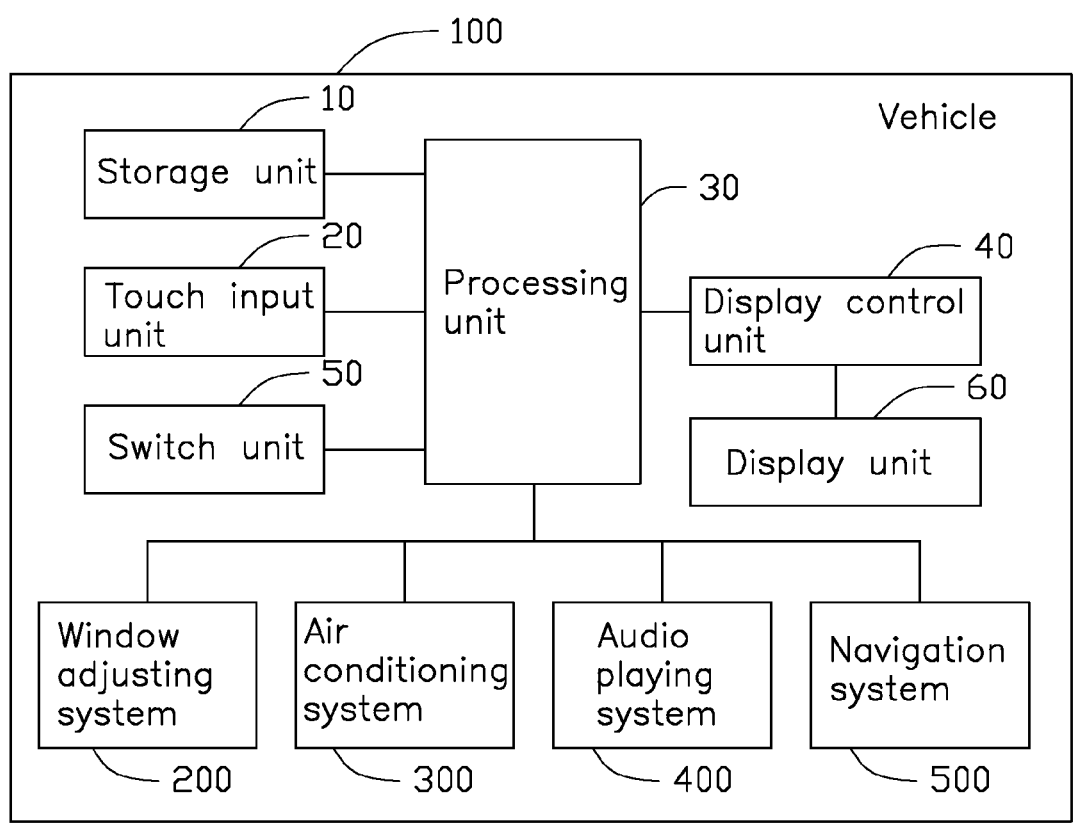
FIG. 1 is a block diagram of an embodiment of an operating environment of a vehicle control system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

The present disclosure relates to an audio control system. The audio control system is mounted within a vehicle. The audio control system includes at least one processing unit, a touch input unit coupled to the at least one processing unit and a non-transitory computer readable medium coupled to the at least one processing unit and configured to store instructions for execution by the at least one processing unit. The instructions cause the at least one processing unit to control the vehicle to switch to an audio playing mode in response to input operations applied on a touch input unit of the vehicle. The instructions cause the at least one processing unit to recognize a gesture in response to input signals generated by the touch input unit in response to input operations applied thereon. The instructions cause the at least one processing unit to compare the gesture with a plurality of predefined gestures stored in a storage unit of the vehicle. The instructions cause the at least one processing unit to determine whether the gesture is same as one of the plurality of predefined gestures. The instructions cause the at least one processing unit to obtain a control order corresponding to the one of the plurality of predefined gestures when the gesture matches the one of the plurality of predefined gestures. The instructions cause the at least one processing unit to control a volume of the audio player of the vehicle to increase or decrease according to the control order. Therein, when the gesture is recognized to be a touch gesture sliding in the touch input unit towards a first direction, the control order generated is to control the volume of an audio player of the vehicle to increase. When the gesture is recognized to be a touch gesture sliding in the touch input unit towards a second direction opposite to the first direction, the control order generated is to control the volume of the audio player of the vehicle to decrease.

The present disclosure relates to an audio control method. The audio control method includes as follows. Controlling a vehicle to switch to an audio playing mode in response to input operations applied on a touch input unit of a vehicle. Recognizing a gesture in response to input signals, therein, the input signals are generated by the touch input unit of the vehicle in response to input operations applied thereon. Comparing the gesture with a plurality of predefined gestures stored in a storage unit of the vehicle. Determining whether the gesture is same as one of the plurality of predefined gestures. Obtaining a control order corresponding to the one of the plurality of predefined gestures when the gesture matches the one of the plurality of predefined gestures. Controlling a volume of the audio player of the vehicle to increase or decrease according to the control order. Therein, when the gesture is recognized to be a touch gesture sliding in the touch input unit towards a first direction, the control order generated is to control the volume of an audio player of the vehicle to increase. When the gesture is recognized to be a touch gesture sliding in the touch input unit towards a second direction opposite to the first direction, the control order generated is to control the volume of the audio player of the vehicle to decrease.

The present disclosure relates to a non-transitory storage medium having stored thereon instructions that, when executed by at least one processing unit of a vehicle, causes the least one processor to execute instructions of an audio control method. The audio control method includes as follows. Controlling a vehicle to switch to an audio playing mode in response to input operations applied on a touch input unit of a vehicle. Recognizing a gesture in response to input signals, therein, the input signals are generated by the touch input unit of the vehicle in response to input operations applied thereon. Comparing the gesture with a plurality of predefined gestures stored in a storage unit of the vehicle. Determining whether the gesture is same as one of the plurality of predefined gestures. Obtaining a control order corresponding to the one of the plurality of predefined gestures when the gesture matches the one of the plurality of predefined gestures. Controlling a volume of the audio player of the vehicle to increase or decrease according to the control order. Therein, when the gesture is recognized to be a touch gesture sliding in the touch input unit towards a first direction, the control order generated is to control the volume of an audio player of the vehicle to increase. When the gesture is recognized to be a touch gesture sliding in the touch input unit towards a second direction opposite to the first direction, the control order generated is to control the volume of the audio player of the vehicle to decrease.

Figure 3:
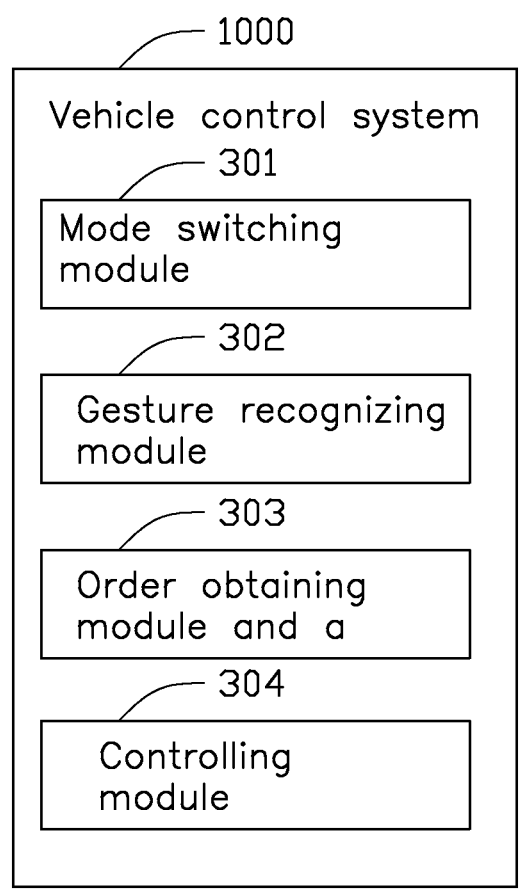
FIG. 3 is a block diagram of an embodiment of the vehicle control system.

FIG. 1 shows an operating environment of a vehicle control system 1000 as shown in FIG. 3. The operating environment can include but not limited to a vehicle 100.

The vehicle 100 can include a storage unit 10, a plurality of touch input units 20 (only one is shown), a processing unit 30, a display control unit 40, a switch unit 50 and a display unit 60.

The storage unit 10 can be used to store a relationship recording a plurality of predefined gestures and a plurality of control orders.

In at least one embodiment, the storage unit 10 can be an internal storage system, such as a flash memory, a random access memory (RAM) for temporary storage of information, and/or a read-memory (ROM) for permanent storage of information.

In at least one embodiment, the storage unit 10 can also be a storage system, such as a hard disk, a storage card, or a data storage medium. The storage unit 10 can include volatile and/or non-volatile storage devices.

In at least one embodiment, the storage unit 10 can include two or more storage devices such that one storage device is a memory and the other storage device is a hard drive. Additionally, the storage unit 10 can be respectively located either entirely or partially external relative to the vehicle 100.

In at least one embodiment, the processing unit 30 can be one of a central processing unit, a digital signal processor, or a single chip.

The touch input unit 20 can be used to generate input signals in response to input operations applied thereon. In this embodiment, the touch input unit 20 can be a touchpad. The touchpad can be used to generate input signals containing touch locations in response to input operations applied thereon. In at least one embodiment, the touch input unit 20 can be but not limited to a capacitive touch screen, a resistive touch screen, an infrared touch screen, a surface acoustic wave touch screen or other suitable touch screen.

In this embodiment, the plurality of the touch input units 20 and the plurality of the vehicle windows (now shown) can be same. Each touch input unit 20 can be adjacent to one vehicle window, and further mounted on an inner vehicle door adjacent to the vehicle window. In at least one embodiment, one of the plurality of touch input units 20 can be further mounted on a control console (not shown) of the vehicle 100.

Figure 2:
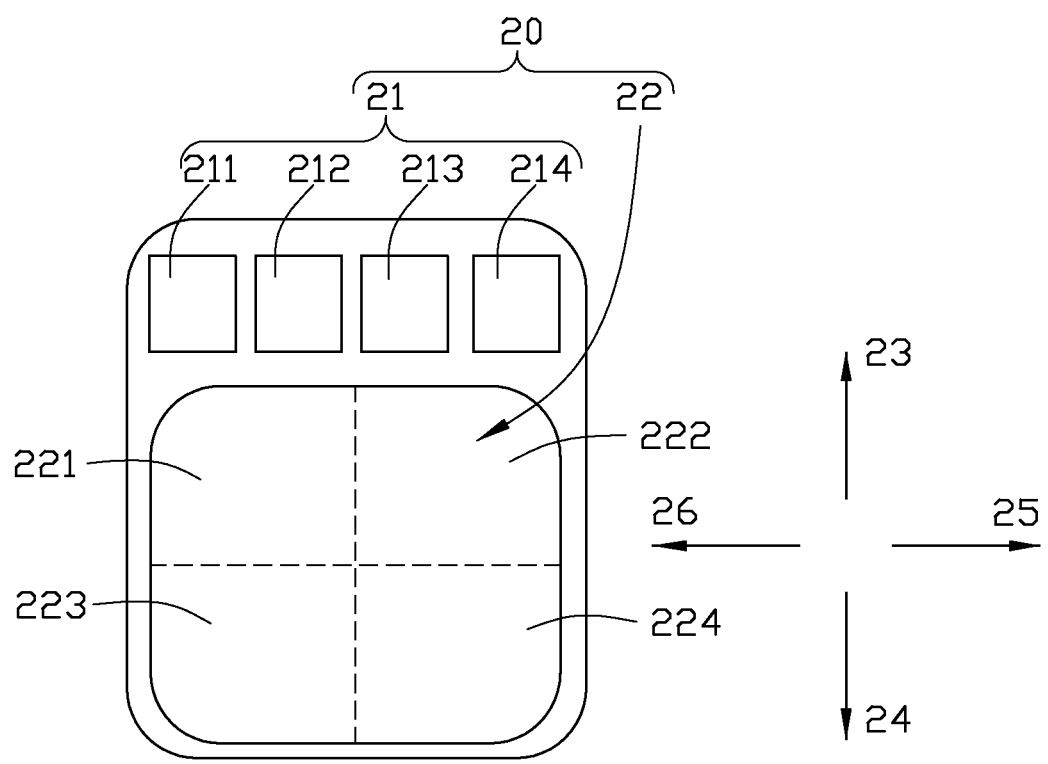
FIG. 2 is diagrammatic of a touch input unit as shown in FIG. 1.

FIG. 2 shows the touch input unit 20 as shown in FIG. 1. Each touch input unit 20 can include a first touch region 21. The first touch region 21 can include but not limited to four touch sub-regions. The four touch sub-regions can be a first touch sub-region 211, a second touch sub-region 212, a third touch sub-region 213 and a fourth touch sub-region 214.

As illustrated in FIGS. 1 and 2, the vehicle 100 can further include four auxiliary systems. The four auxiliary systems can be window adjusting system 200, air conditioning system 300, audio playing system 400 and navigation system 500. The vehicle control system 1000 can be used to control the four auxiliary systems to cooperatively work.

The vehicle 100 can further include four controlling modes. The four controlling modes can be window adjusting mode, air conditioning mode, audio playing mode and navigation mode. The first touch sub-region 211 can be corresponding to the windows adjusting system 200 and used to touch thereon such that the window adjusting mode can be entered into. The second touch sub-region 212 can be corresponding to the air conditioning system 300 and used to touch thereon such that the air conditioning mode can be entered into. The third touch sub-region 213 can be corresponding to the audio playing system 400 and used to touch thereon such that the audio playing mode can be entered into. The fourth touch sub-region 214 can be corresponding to the navigation system 500 and used to touch thereon such that the navigation mode can be entered into. In at least one embodiment, the corresponding relationship between the four touch sub-regions and the four auxiliary systems can be adjusted according to need.

Each touch input unit 20 can further include a second touch region 22 adjacent to the first touch region 21. When the vehicle 100 is in any one of the four controlling modes, the second touch region 22 can be used to touch thereon such that the corresponding auxiliary system can be controlled. The second touch region 22 can include a left front region 221, a right front region 222, a left rear region 223 and a right rear region 224.

A first direction 23, a second direction 24, a third direction 25 and a fourth direction 26 can be defined. Each touch input unit 20 can have a front side, a back side, a left side and a right side. The first direction 23 can be a direction from the back side to the front side. The second side 24 can be a direction from the front side to the back side. The third side 25 can be a direction from the left side to the right side. The fourth side 26 can be a direction from the right side to the left side.

The switch unit 50 can be used to control the vehicle control system 1000 to turn on or turn off. The switch unit 50 can be not used to control the four auxiliary systems to turn on or turn off. In at least one embodiment, the switch unit 50 can be a single mechanical key, or a virtual key displayed on the touch input unit 20, or the like.

The display control unit 40 can be used to control the display unit 60 to display working statuses of the four auxiliary systems on time. The display unit 60 can be a head-up display mounted on the windshield of the vehicle 100. In at least one embodiment, the display unit 60 can be a screen which is overlapped on the touch input unit 20.

FIG. 3 shows the vehicle control system 1000. The vehicle control system 1000 can include a plurality of modules. The plurality of modules can include a mode switching module 301, a gesture recognizing module 302, an order obtaining module 303 and a controlling module 304. Referring to FIGS. 1 and 3, the plurality of modules can be stored in the storage unit 10, and further applied on the processing unit 30. The modules of the vehicle control system 1000 can include separated functionalities represented by hardware or integrated circuits, or as software and hardware combinations, such as a special-purpose processor or a general-purpose processor with special-purpose firmware.

Referring to FIGS. 2 and 3, the mode switching module 301 can be used to control the vehicle 100 to switch the vehicle 100 into one controlling mode in response to the input operations applied on the first touch sub-region 211, the second touch sub-region 212, the third touch sub-region 213 or the fourth touch sub-region 214.

The gesture recognizing module 302 can be used to recognize a gesture in response to the input signals. The gesture recognizing module 302 can be further used to smooth the gesture, eliminate noise of the gesture and extract image features from the gesture, such that, a processed gesture can be obtained.

The order obtaining module 303 can be used to compare the processed gesture with the plurality of predefined gestures stored in the storage unit 10 one by one. The order obtaining module 303 can be used to determine whether the processed gesture is same as one of the plurality of predefined gestures preciously or in the error-allowed range. The order obtaining module 303 can be further used to obtain a control order corresponding to the one of the plurality of predefined gestures when the processed gesture is same as the one of the plurality of predefined gestures preciously or in the error-allowed range.

The controlling module 304 can be used to control one of the four auxiliary systems to work according to the control order. The display control unit 40 can be further used to control the display unit 60 to display the control order in a way of character according to the control order.

The mode switching module 301 can be used to control the vehicle 100 to switch to the window adjusting mode in response to the input operations applied on the first touch sub-region 211.

Figure 4A:
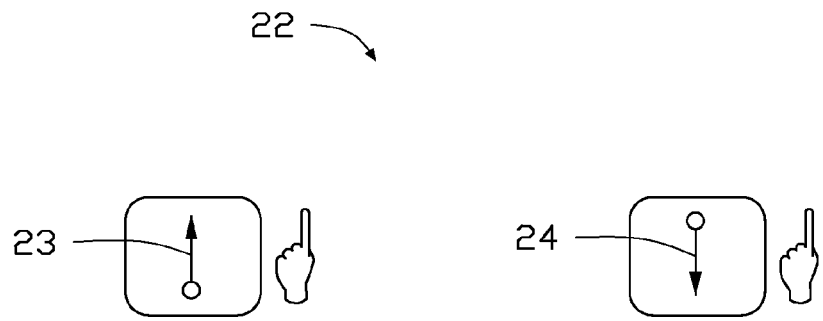
FIGS. 4A-4D are diagrammatic views of an embodiment of gestures for controlling a window adjusting system.

If the vehicle 100 is in the window adjusting mode, referring to FIGS. 1, 2 and 4A, when the gesture recognizing module 302 recognizes a touch gesture sliding on the second touch region 22 of any one touch input unit 20 towards the first direction 23, the order obtaining module 303 can obtain a control order corresponding to a predefined gesture which is same as the touch gesture preciously or in the error-allowed range from the relationship stored in the storage unit 10. The control order is herein configured to control the vehicle window to rise a highest point. The controlling module 304 can control the vehicle window corresponding to the touch input unit 20 to rise the highest point. When the gesture recognizing module 302 recognizes a touch gesture sliding on the second touch region 22 of the touch input unit 20 towards the second direction 24, the order obtaining module 303 can obtain a control order corresponding to a predefined gesture which is same as the touch gesture preciously or in the error-allowed range from the relationship stored in the storage unit 10. The control order is herein configured to control the vehicle window to go down a lowest point. The controlling module 304 can control the vehicle window corresponding to the touch input unit 20 to go down the lowest point.

Figure 4B:
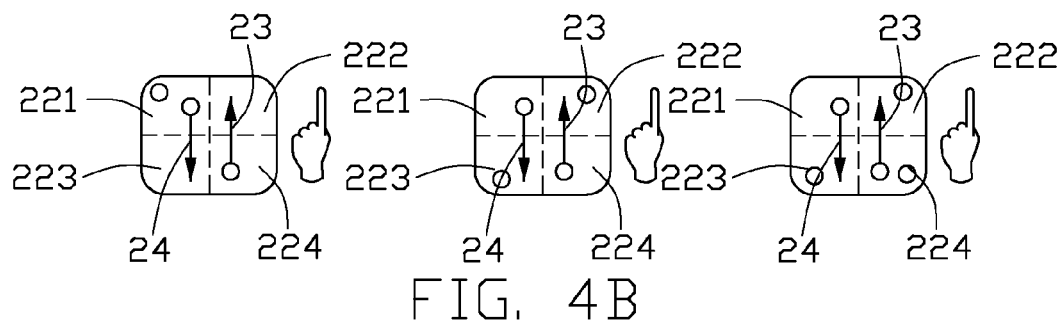

When the vehicle 100 is in the window adjusting mode, referring to FIGS. 1 and 4B, the left front region 221 can be corresponding to a left front vehicle window (not shown) of the vehicle 100, the right front region 222 can be corresponding to a right front vehicle window (not shown) of the vehicle 100, the left rear region 223 can be corresponding to a left rear vehicle window (not shown) of the vehicle 100 and the right rear region 224 can be corresponding to a right rear vehicle window (not shown) of the vehicle 100.

If the vehicle 100 is in the window adjusting mode, referring to FIGS. 1, 2 and 4B, when the gesture recognizing module 302 recognizes a click gesture clicking one of the four touch sub-regions, the vehicle window corresponding to the one of the four touch sub-regions can be selected. In detail, when the gesture recognizing module 302 recognizes the click gesture clicking the left front region 221, the right front region 222, the left rear region 223 and/or the right rear region 224 to select one or more vehicle windows, and a touch gesture sliding on the second touch region 22 of any one touch input unit 20 towards the first direction 23, the order obtaining module 303 can obtain a control order corresponding to a predefined gesture which is same as the click gesture and the touch gesture preciously or in the error-allowed range from the relationship stored in the storage unit 10. The control order is herein configured to control the selected vehicle windows to rise the highest point. The controlling module 304 can control the selected vehicle windows to rise the highest point according to the control order. When the gesture recognizing module 302 recognizes the click gesture clicking the left front region 221, the right front region 222, the left rear region 223 and/or the right rear region 224 to select one or more vehicle windows, and a touch gesture sliding on the second touch region 22 of any one touch input unit 20 towards the second direction 24, the order obtaining module 303 can obtain a control order corresponding to a predefined gesture which is same as the click gesture and the touch gesture preciously or in the error-allowed range from the relationship stored in the storage unit 10. The control order is herein configured to control the selected vehicle windows to go down the lowest point. The controlling module 304 can control the selected vehicle windows to go down the lowest point according to the control order.

Figure 4C:
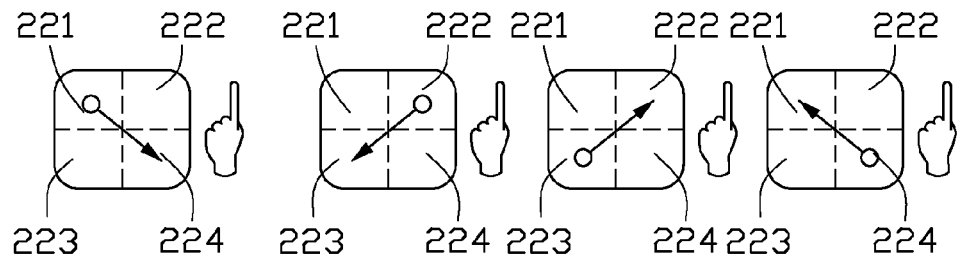

If the vehicle 100 is in the window adjusting mode, referring to FIGS. 1, 2 and 4C, when the gesture is recognized to be a slide gesture sliding on the second touch region 22 of any one touch input unit 20 from the left front region 221 to the right rear region 224, the control order can be configured to control the left front vehicle window to rise or go down. When the gesture recognizing module 302 recognizes the slide gesture sliding on the second touch region 22 from the left front region 221 to the right rear region 224, and the left front vehicle window is fully close, the order obtaining module 303 can obtain a control order corresponding to a predefined gesture which is same as the slide gesture preciously or in the error-allowed range from the relationship stored in the storage unit 10. The control order is herein configured to control the left front vehicle window to go down the lowest point. The controlling module 304 can control the left front vehicle window to go down the lowest point according to the control order. When the gesture recognizing module 302 recognizes the slide gesture sliding on the second touch region 22 from the left front region 221 to the right rear region 224, and the left front vehicle window is fully open, the order obtaining module 303 can obtain a control order corresponding to a predefined gesture which is same as the slide gesture preciously or in the error-allowed range from the relationship stored in the storage unit 10. The control order is herein configured to control the left front vehicle window to rise the highest point. The controlling module 304 can control the left front vehicle window to rise the highest point according to the control order. When the gesture recognizing module 302 recognizes the slide gesture sliding on the second touch region 22 from the left front region 221 to the right rear region 224, and the left front vehicle window is partially open, the order obtaining module 303 can obtain a control order corresponding to a predefined gesture which is same as the slide gesture preciously or in the error-allowed range from the relationship stored in the storage unit 10. The control order is herein configured to control the left front vehicle window to rise the highest point. The controlling module 304 can control the left front vehicle window to rise the highest point according to the control order. When the gesture recognizing module 302 recognizes the slide gesture sliding on the second touch region 22 from the left front region 221 to the right rear region 224 two times, and the left front vehicle window is partially open, the order obtaining module 303 can obtain a control order corresponding to a predefined gesture which is same as the slide gesture preciously or in the error-allowed range from the relationship stored in the storage unit 10. The control order is herein configured to control the left front vehicle window to go down the lowest point. The controlling module 304 can control the left front vehicle window to go down the lowest point according to the control order.

If the vehicle 100 is in the window adjusting mode, referring to FIGS. 1, 2 and 4C, when the gesture is recognized to be a slide gesture sliding on the second touch region 22 of any one touch input unit 20 from the right front region 222 to the left rear region 223, the control order can be configured to control the right front vehicle window to rise or go down. When the gesture recognizing module 302 recognizes the slide gesture sliding on the second touch region 22 from the right front region 222 to the left rear region 223, and the right front vehicle window is fully close, the order obtaining module 303 can obtain a control order corresponding to a predefined gesture same to the slide gesture preciously or in the error-allowed range from the relationship stored in the storage unit 10. The control order is herein configured to control the right front vehicle window to go down the lowest point. The controlling module 304 can control the right front vehicle window to go down the lowest point according to the control order. When the gesture recognizing module 302 recognizes the slide gesture sliding on the second touch region 22 from the right front region 222 to the left rear region 223, and the right front vehicle window is fully open, the order obtaining module 303 can obtain a control order corresponding to a predefined gesture same to the slide gesture preciously or in the error-allowed range from the relationship stored in the storage unit 10. The control order is herein configured to control the right front vehicle window to rise the highest point. The controlling module 304 can control the right front vehicle window to rise the highest point according to the control order. When the gesture recognizing module 302 recognizes the slide gesture sliding on the second touch region 22 from the right front region 222 to the left rear region 223, and the right front vehicle window is partially open, the order obtaining module 303 can obtain a control order corresponding to a predefined gesture same to the slide gesture preciously or in the error-allowed range from the relationship stored in the storage unit 10. The control order is herein configured to control the right front vehicle window to rise the highest point. The controlling module 304 can control the right front vehicle window to rise the highest point according to the control order. When the gesture recognizing module 302 recognizes the slide gesture sliding on the second touch region 22 from the right front region 222 to the left rear region 223 two times, and the right front vehicle window is partially open, the order obtaining module 303 can obtain a control order corresponding to a predefined gesture same to the slide gesture preciously or in the error-allowed range from the relationship stored in the storage unit 10. The control order is herein configured to control the right front vehicle window to go down the lowest point. The controlling module 304 can control the right front vehicle window to go down the lowest point according to the control order.

If the vehicle 100 is in the window adjusting mode, referring to FIGS. 1, 2 and 4C, when the gesture is recognized to be a slide gesture sliding on the second touch region 22 of any one touch input unit 20 from the left rear region 223 to the right front region 222, the control order can be configured to control the left rear vehicle window to rise or go down. When the gesture recognizing module 302 recognizes the slide gesture sliding on the second touch region 22 from the left rear region 223 to the right front region 222, and the left rear vehicle window is fully close, the order obtaining module 303 can obtain a control order corresponding to a predefined gesture same to the slide gesture preciously or in the error-allowed range from the relationship stored in the storage unit 10. The control order is herein configured to control the left rear vehicle window to go down the lowest point. The controlling module 304 can control the left rear vehicle window to go down the lowest point according to the control order. When the gesture recognizing module 302 recognizes the slide gesture sliding on the second touch region 22 from the left rear region 223 to the right front region 222, and the left rear vehicle window is fully open, the order obtaining module 303 can obtain a control order corresponding to a predefined gesture same to the slide gesture preciously or in the error-allowed range from the relationship stored in the storage unit 10. The control order is herein configured to control the left rear vehicle window to rise the highest point. The controlling module 304 can control the left rear vehicle window to rise the highest point according to the control order. When the gesture recognizing module 302 recognizes the slide gesture sliding on the second touch region 22 from the left rear region 223 to the right front region 222, and the left rear vehicle window is partially open, the order obtaining module 303 can obtain a control order corresponding to a predefined gesture same to the slide gesture preciously or in the error-allowed range from the relationship stored in the storage unit 10. The control order is herein configured to control the left rear vehicle window to rise the highest point. The controlling module 304 can control the left rear vehicle window to rise the highest point according to the control order. When the gesture recognizing module 302 recognizes the slide gesture sliding on the second touch region 22 from the left rear region 223 to the right front region 222 two times, and the left rear vehicle window is partially open, the order obtaining module 303 can obtain a control order corresponding to a predefined gesture same to the slide gesture preciously or in the error-allowed range from the relationship stored in the storage unit 10. The control order is herein configured to control the left rear vehicle window to go down the lowest point. The controlling module 304 can control the left rear vehicle window to go down the lowest point according to the control order.

If the vehicle 100 is in the window adjusting mode, referring to FIGS. 1, 2 and 4C, when the gesture is recognized to be a slide gesture sliding on the second touch region 22 of any one touch input unit 20 from the right rear region 224 to the left front region 221, the control order can be configured to control the right rear vehicle window to rise or go down. When the gesture recognizing module 302 recognizes the slide gesture sliding on the second touch region 22 from the right rear region 224 to the left front region 221, and the right rear vehicle window is fully close, the order obtaining module 303 can obtain a control order corresponding to a predefined gesture same to the slide gesture preciously or in the error-allowed range from the relationship stored in the storage unit 10. The control order is herein configured to control the right rear vehicle window to go down the lowest point. The controlling module 304 can control the right rear vehicle window to go down the lowest point according to the control order. When the gesture recognizing module 302 recognizes the slide gesture sliding on the second touch region 22 from the right rear region 224 to the left front region 221, and the right front vehicle window is fully open, the order obtaining module 303 can obtain a control order corresponding to a predefined gesture same to the slide gesture preciously or in the error-allowed range from the relationship stored in the storage unit 10. The control order is herein configured to control the right rear vehicle window to rise the highest point. The controlling module 304 can control the right rear vehicle window to rise the highest point according to the control order. When the gesture recognizing module 302 recognizes the slide gesture sliding on the second touch region 22 from the right rear region 224 to the left front region 221, and the right rear vehicle window is partially open, the order obtaining module 303 can obtain a control order corresponding to a predefined gesture same to the slide gesture preciously or in the error-allowed range from the relationship stored in the storage unit 10. The control order is herein configured to control the right rear vehicle window to rise the highest point. The controlling module 304 can control the right rear vehicle window to rise the highest point according to the control order. When the gesture recognizing module 302 recognizes the slide gesture sliding on the second touch region 22 from the right rear region 224 to the left front region 221 two times, and the right rear vehicle window is partially open, the order obtaining module 303 can obtain a control order corresponding to a predefined gesture same to the slide gesture preciously or in the error-allowed range from the relationship stored in the storage unit 10. The control order is herein configured to control the right rear vehicle window to go down the lowest point. The controlling module 304 can control the right rear vehicle window to go down the lowest point according to the control order.

Figure 4D:
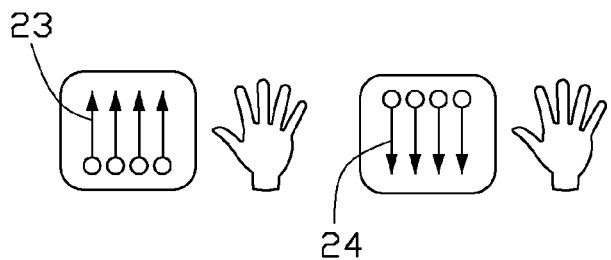

If the vehicle 100 is in the window adjusting mode, referring to FIGS. 1, 2 and 4D, when the gesture recognizing module 302 recognizes four slide gestures sliding on the second touch region 22 simultaneously towards the first direction 23, the order obtaining module 303 can obtain a control order corresponding to a predefined gesture same to the four slide gestures from the relationship stored in the storage unit 10. The control order can be configured to control the four vehicle windows to rise the highest point. The controlling module 304 can control the four vehicle windows to rise the highest point according to the control order. When the gesture recognizing module 302 recognizes four slide gestures sliding on the second touch region 22 simultaneously towards the second direction 24, the order obtaining module 303 can obtain a control order corresponding to a predefined gesture same to the four slide gestures from the relationship stored in the storage unit 10. The control order is herein configured to control the four vehicle windows to go down the lowest point. The controlling module 304 can control the four vehicle windows to go down the lowest according to the control order.

In at least one embodiment, when the vehicle windows are rising or going down, if the gesture recognizing module 302 recognizes a click gesture clicking the touch input unit 20, the controlling module 304 can control the vehicle window corresponding to the touch input unit 20 to stop rising or going down.

In at least one embodiment, each vehicle window can further rise following a siding gesture applied on the touch input unit 20 adjacent to the vehicle window and sliding towards the first direction 23. The rising distance is proportional to the sliding distance of the siding gesture along the first direction 23. Each vehicle window can further goes down following a siding gesture applied on the touch input unit 20 adjacent to the vehicle window and sliding towards the second direction 24. The dropping distance is proportional to the sliding distance of the siding gesture along the second direction 24. Furthermore, each vehicle window can further stop to rise or go down when the slide gesture is stopped.

Figure 5:
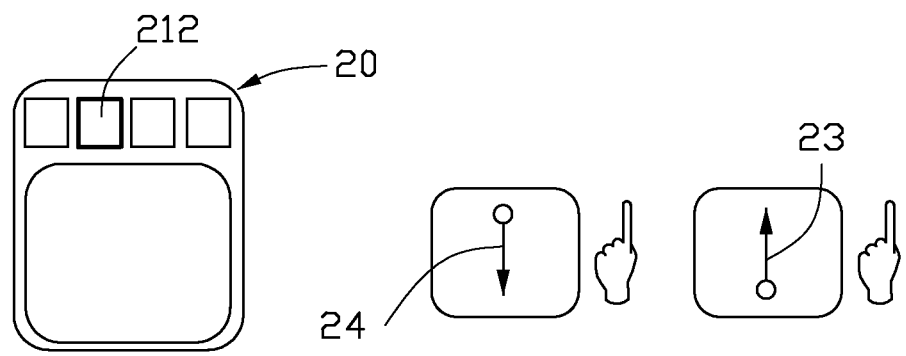
FIG. 5 is a diagrammatic view of an embodiment of gestures for controlling an air conditioning system.

Referring to FIG. 5, the mode switching module 301 can be used to control the vehicle 100 to switch to the air conditioning mode in response to the input operations applied on the second touch sub-region 212.

If the vehicle 100 is in the air conditioning mode, when the gesture recognizing module 302 recognizes a slide gesture sliding on the second touch region 22 towards the first direction 23, the order obtaining module 303 can obtain a control order corresponding to a predefined gesture same to the slide gesture from the relationship stored in the storage unit 10. The control order is herein configured to control the temperature of the air conditioner (not shown) of the vehicle 100 to increase from the storage unit 10. The controlling module 304 can control the air conditioner to increase according to the control order. The increased value of the temperature of the air conditioner is proportional to the sliding distance of the slide gesture along the first direction 23. When the gesture recognizing module 302 recognizes a slide gesture sliding on the second touch region 22 towards the second direction 24, the order obtaining module 303 can obtain a control order corresponding to a predefined gesture same to the slide gesture from the relationship stored in the storage unit 10. The control order is herein configured to control the temperature of the air conditioner (not shown) of the vehicle 100 to decrease from the storage unit 10. The controlling module 304 can control the air conditioner to decrease according to the control order. The decreased value of the temperature of the air conditioner is proportional to the sliding distance of the slide gesture along the second direction 24.

In at least one embodiment, the display control unit 40 can be further used to control the display unit 60 to display the increased value or the decreased value thereon.

Figure 6:
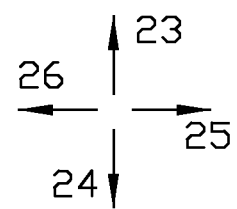
FIG. 6 is a diagrammatic view of an embodiment of gestures for controlling an audio playing system.
Figure 6:
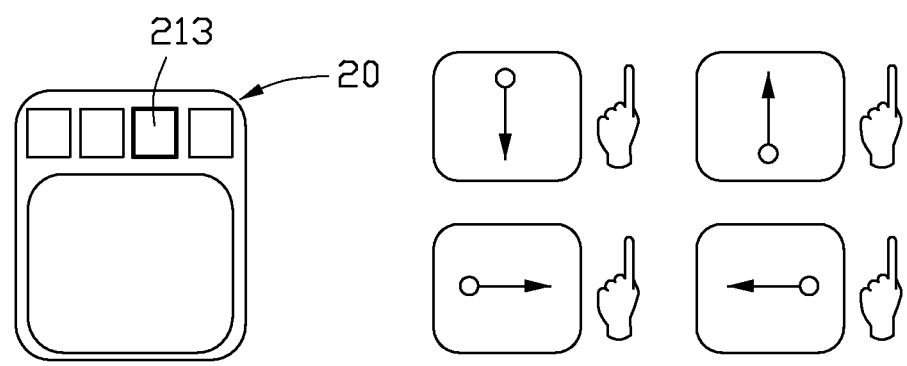

Referring to FIG. 6, the mode switching module 301 can be used to control the vehicle 100 to switch to the audio playing mode in response to the input operations applied on the third touch sub-region 213.

If the vehicle 100 is in the audio conditioning mode, when the gesture recognizing module 302 recognizes a slide gesture sliding on the second touch region 22 towards the first direction 23, the order obtaining module 303 can obtain a control order corresponding to a predefined gesture same to the slide gesture from the relationship stored in the storage unit 10. The control order is herein configured to control the volume of the audio player (not shown) of the vehicle 100 to increase from the storage unit 10. The controlling module 304 can control the audio player to increase according to the control order. The increased value of the volume of the audio player is proportional to the sliding distance of the slide gesture along the first direction 23.

When the gesture recognizing module 302 recognizes a slide gesture sliding on the second touch region 22 towards the second direction 24, the order obtaining module 303 can obtain a control order corresponding to a predefined gesture same to the slide gesture. The control order is herein configured to control the volume of the audio player of the vehicle 100 to decrease from the storage unit 10. The controlling module 304 can control the volume of the audio player to decrease according to the control order. The decreased value of the volume of the audio player is proportional to the sliding distance of the slide gesture along the second direction 24.

When the gesture recognizing module 302 recognizes a slide gesture sliding on the second touch region 22 towards the third direction 25, the order obtaining module 303 can obtain a control order corresponding to a predefined gesture same to the slide gesture. The control order is herein configured to control the audio player of the vehicle 100 to play next song from the storage unit 10. The controlling module 304 can control the audio player of the vehicle 100 to play next song according to the control order.

When the gesture recognizing module 302 recognizes a slide gesture sliding on the second touch region 22 towards the fourth direction 26, the order obtaining module 303 can obtain a control order corresponding to a predefined gesture same to the slide gesture. The control order is herein configured to control the audio player of the vehicle 100 to play previous song from the storage unit 10. The controlling module 304 can control the audio player of the vehicle 100 to play previous song according to the control order.

In at least one embodiment, the display control unit 40 can be further used to control the display unit 60 to display the increased value, the decreased value, the next song and/or the previous song thereon.

Figure 7:
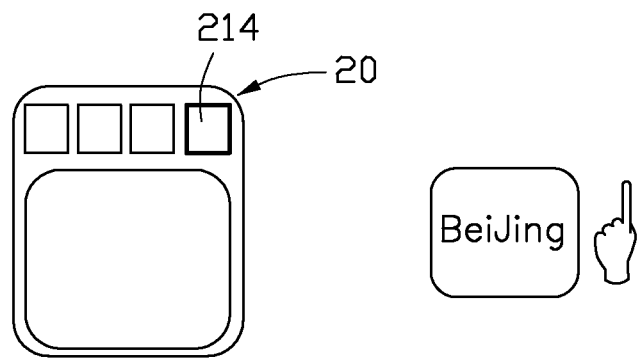
FIG. 7 is a diagrammatic view of an embodiment of gestures for controlling a navigation system.

Referring to FIG. 7, the mode switching module 301 can be used to control the vehicle 100 to switch to the navigation mode in response to the input operations applied on the fourth touch sub-region 214.

If the vehicle 100 is in the navigation mode, when the gesture recognizing module 302 recognizes a gesture touched on the second touch region 22, the order obtaining module 303 can obtain the characters corresponding to the gesture. The display control unit 40 can control the display unit 60 to display the characters. The controlling module 304 can regard the characters as a destination and control the navigation system 500 to navigate according to the characters.

In at least one embodiment, the touch input unit 20 mounted on the control console of the vehicle 100 can include the first touch region 21 and the second touch region 22, the other touch input units 20 can only include the second touch regions 22.

In at least one embodiment, the touch input unit 20 can be further used to display, such that the touch input unit 20 can display the status of the vehicle window adjacent to the touch input unit 20.

In at least one embodiment, the touch input unit 20 mounted on the control console of the vehicle 100 can further include a control unit (not shown). The control unit can be used to control the other touch input units 20 to turn on or turn off.

Figure 8:
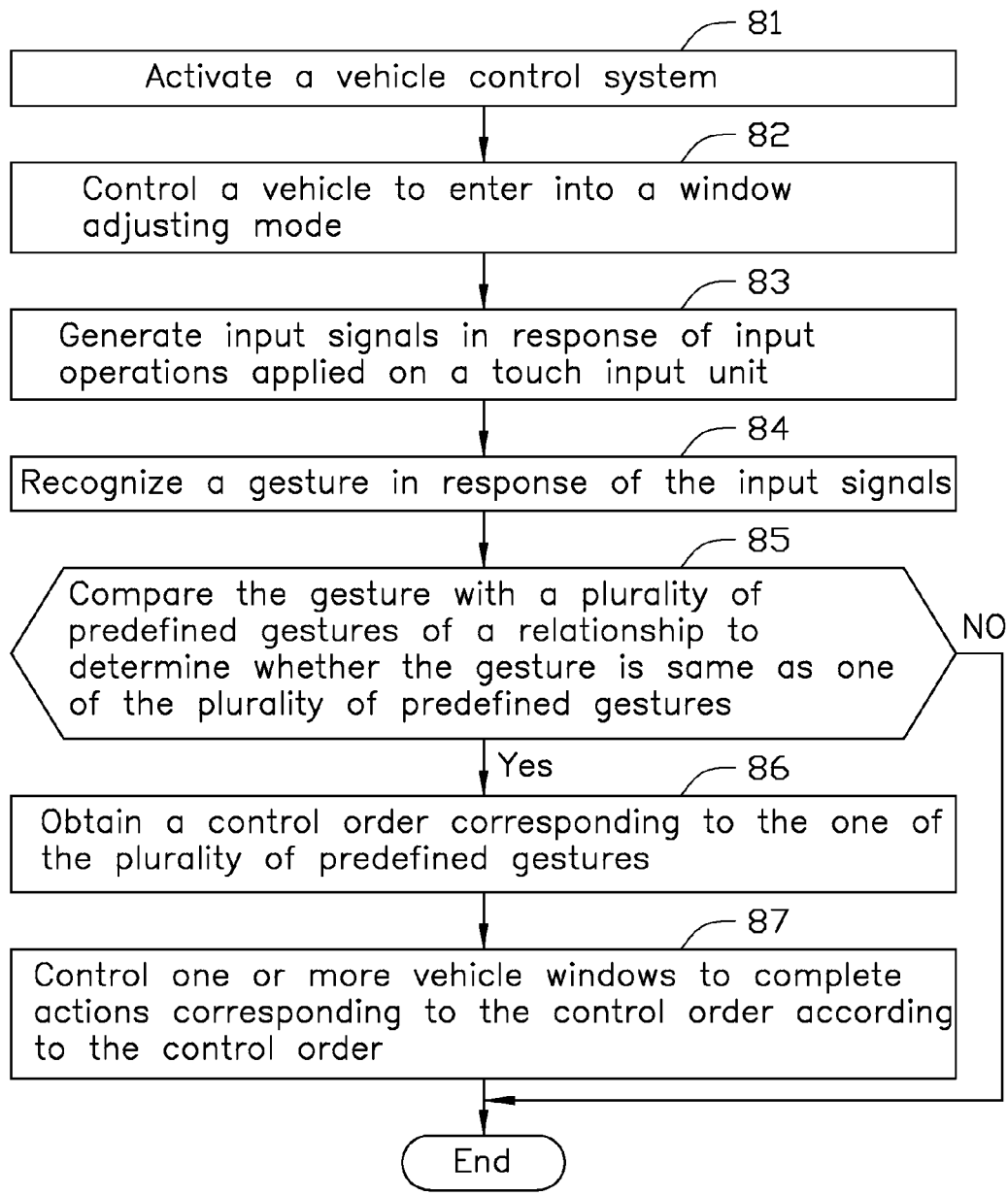
FIG. 8 is a flowchart of an embodiment of a window control method for controlling the window adjusting system.

FIG. 8 illustrates a flowchart of a window control method for controlling the window adjusting system. The window control method can be mounted within a vehicle. The window control method is provided by way of example, as there are a variety of ways to carry out the method. The window control method described below can be carried out using the configurations illustrated in FIG. 3, for example, and various elements of these figures are referenced in explaining the example method. Each block shown in FIG. 8 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 81.

At block 81, a vehicle control system is activated. A switch unit is pressed to activate the vehicle control system, At block 82, a mode switching module controls a vehicle to enter into a window adjusting mode. A first touch sub-region of a touch input unit is touched such that the window adjusting mode is entered into.

At block 83, the touch input unit generates input signals in response to input operations applied on a second touch region of the touch input unit. The input operations can be but not limited to: a touch gesture sliding on the second touch region towards a first direction or a second direction, a click gesture clicking a left front region, a right front region, a left rear region and/or a right rear region to select one or more vehicle windows and a touch gesture sliding on the second touch region towards the first direction or the second direction, a slide gesture sliding on the second touch region from the left front region to the right rear region, or from the right front region to the left rear region, or from the left rear region to the right front region, or from the right rear region to the left front region, and/or four slide gestures sliding on the second touch region simultaneously towards the first direction or the second direction.

At block 84, the input signals are responded to recognize a gesture. A gesture recognizing module recognizes the gesture in response to the input signals.

At block 85, the gesture is compared with a plurality of predefined gestures of a relationship to determine whether the gesture is same as one of the plurality of predefined gestures, if yes, the process goes to block 86, otherwise, the process goes to end. An order obtaining module compares the gesture with the plurality of predefined gestures of the relationship to determine the gesture is same as one of the plurality of predefined gestures, if yes, the process goes to block 85, otherwise, the process goes to end.

At block 86, a control order corresponding to the one of the plurality of predefined gestures is obtained. The order obtaining module obtains the control order corresponding to the one of the predefined gestures. If the gesture is the touch gesture sliding on the second touch region towards the first direction, the control order is herein configured to control the vehicle window to rise a highest point. If the gesture is the touch gesture sliding on the second touch region towards the second direction, the control order herein configured to control the vehicle window to go down a lowest point. If the gesture is the click gesture clicking the left front region, the right front region, the left rear region and/or the right rear region to select one or more vehicle windows and the touch gesture sliding on the second touch region towards the first direction, the control order is herein configured to control the selected vehicle windows to rise the highest point. If the gesture is the click gesture clicking the left front region, the right front region, the left rear region and/or the right rear region to select one or more vehicle windows and the touch gesture sliding on the second touch region towards the second direction, the control order is herein configured to control the selected vehicle windows to go down the lowest point. If the gesture is the slide gesture sliding on the second touch region from the left front region to the right rear region and the left front vehicle window is fully close, the control order is herein configured to control the left front vehicle window to go down the lowest point. If the gesture is the slide gesture sliding on the second touch region from the left front region to the right rear region and the left front vehicle window is fully open, the control order generated is to control the left front vehicle window to rise the highest point. If the gesture is the slide gesture sliding on the second touch region from the left front region to the right rear region and the left front vehicle window is partially open, the control order is herein configured to control the left front vehicle window to rise the highest point. If the gesture is the slide gesture sliding on the second touch region from the left front region to the right rear region two times and the left front vehicle window is partially open, the control order is herein configured to control the left front vehicle window to go down the lowest point. If the gesture is the slide gesture sliding on the second touch region from the right front region to the left rear region and the right front vehicle window is fully close, the control order is herein configured to control the right front vehicle window to go down the lowest point. If the gesture is the slide gesture sliding on the second touch region from the right front region to the left rear region and the right front vehicle window is fully open, the control order is herein configured to control the right front vehicle window to rise the highest point. If the gesture is the slide gesture sliding on the second touch region from the right front region to the left rear region and the right front vehicle window is partially open, the control order is herein configured to control the right front vehicle window to rise the highest point. If the gesture is the slide gesture sliding on the second touch region from the right front region to the left rear region two times and the right front vehicle window is partially open, the control order is herein configured to control the right front vehicle window to go down the lowest point. If the gesture is the slide gesture sliding on the second touch region from the left rear region to the right front region and the left rear vehicle window is fully close, the control order is herein configured to control the left rear vehicle window to go down the lowest point. If the gesture is the slide gesture sliding on the second touch region from the left rear region to the right front region and the left rear vehicle window is fully open, the control order is herein configured to control the left rear vehicle window to rise the highest point. If the gesture is the slide gesture sliding on the second touch region from the left rear region to the right front region and the left rear vehicle window is partially open, the control order is herein configured to control the left rear vehicle window to rise the highest point. If the gesture is the slide gesture sliding on the second touch region from the left rear region to the right front region two times and the left rear vehicle window is partially open, the control order is herein configured to control the left rear vehicle window to go down the lowest point. If the gesture is the slide gesture sliding on the second touch region from the right rear region to the left front region and the right rear vehicle window is fully close, the control order is herein configured to control the right rear vehicle window to go down the lowest point. If the gesture is the slide gesture sliding on the second touch region from the right rear region to the left front region and the right rear vehicle window is fully open, the control order is herein configured to control the right rear vehicle window to rise the highest point. If the gesture is the slide gesture sliding on the second touch region from the right rear region to the left front region and the right rear vehicle window is partially open, the control order is herein configured to control the right rear vehicle window to rise the highest point. If the gesture is the slide gesture sliding on the second touch region from the right rear region to the left front region two times and the right rear vehicle window is partially open, the control order is herein configured to control the right rear vehicle window to go down the lowest point. If the gesture is the four slide gestures sliding on the second touch region simultaneously towards the first direction, the control order is herein configured to control the four vehicle windows to rise the highest point. If the gesture is the four slide gestures sliding on the second touch region simultaneously towards the second direction, the control order is herein configured to control the four vehicle windows to go down the lowest point.

At block 87, a controlling module controls the vehicle windows to complete actions corresponding to the control order according to the control order.

Figure 9:
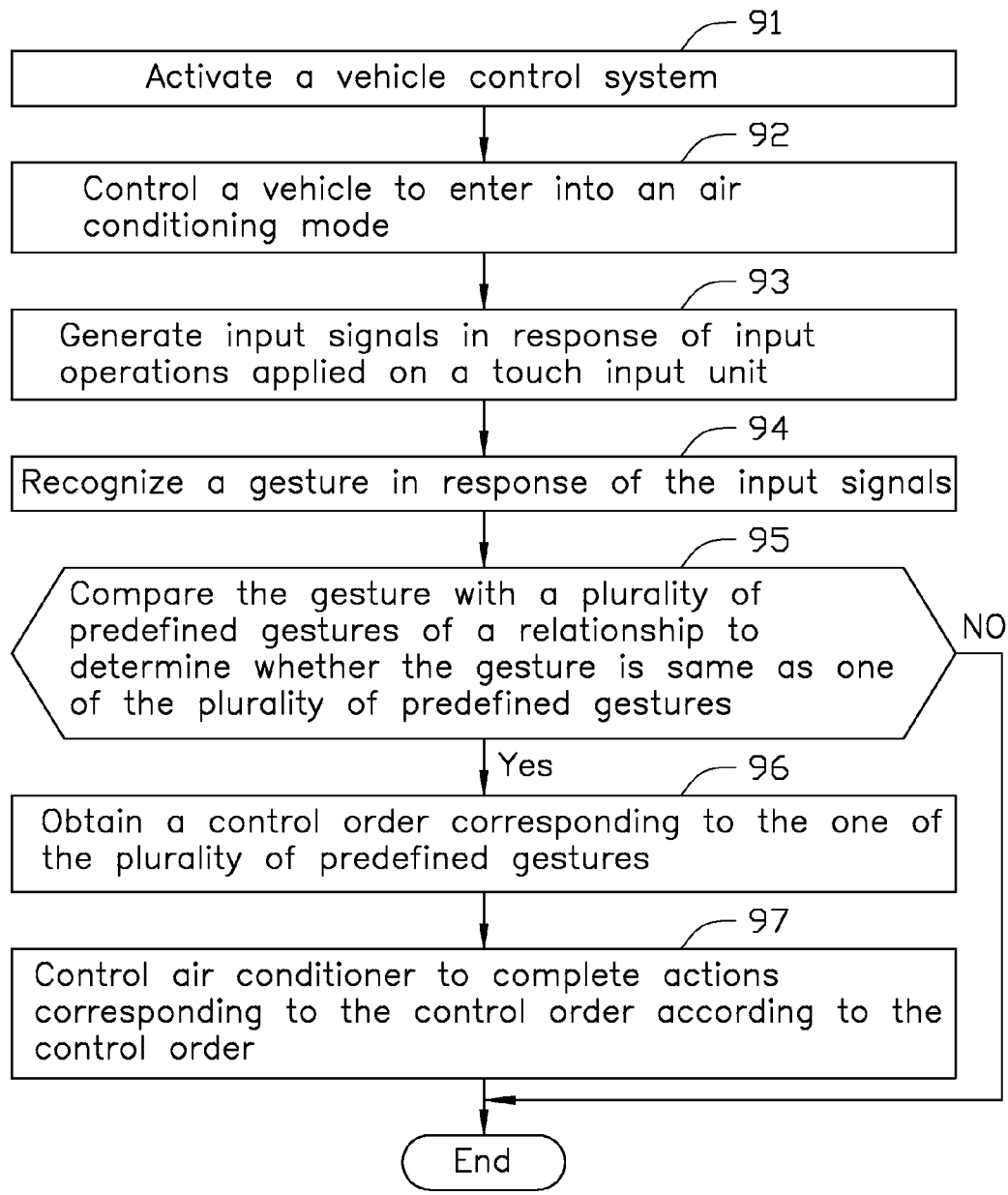
FIG. 9 is a flowchart of an embodiment of an air conditioner control method for controlling the air conditioning system.

FIG. 9 illustrates a flowchart of an air conditioner control method for controlling the air conditioning system. The air conditioner control method can be mounted within a vehicle. The air conditioner control method is provided by way of example, as there are a variety of ways to carry out the method. The air conditioner control method described below can be carried out using the configurations illustrated in FIG. 3, for example, and various elements of these figures are referenced in explaining the example method. Each block shown in FIG. 9 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 91.

At block 91, a vehicle control system is activated. A switch unit is pressed to activate the vehicle control system.

At block 92, a mode switching module controls a vehicle to enter into an air conditioning mode. A second touch sub-region of a touch input unit is touched such that the air conditioning mode is entered into.

At block 93, the touch input unit generates input signals in response to input operations applied on a second touch region of the touch input unit. The input operations can be but not limited to: a slide gesture sliding on the second touch region towards a first direction and/or a slide gesture sliding on the second touch region towards a second direction.

At block 94, the input signals are responded to recognize a gesture. A gesture recognizing module recognizes the gesture in response to the input signals.

At block 95, the gesture is compared with a plurality of predefined gestures of a relationship to determine whether the gesture is same as one of the plurality of predefined gestures, if yes, the process goes to block 96, otherwise, the process goes to end. An order obtaining module compares the gesture with the plurality of predefined gestures of the relationship to determine the gesture is same as one of the plurality of predefined gestures, if yes, the process goes to block 96, otherwise, the process goes to end.

At block 96, a control order corresponding to the one of the predefined gestures is obtained. The order obtaining module obtains the control order corresponding to the one of the predefined gestures. If the gesture is the slide gesture sliding on the second touch region towards the first direction, the control order is herein configured to control a temperature of an air conditioner of the vehicle to increase. If the gesture is the slide gesture sliding on the second touch region towards the second direction, the control order is herein configured to control the temperature of the air conditioner of the vehicle to decrease.

At block 97, a controlling module controls the air conditioner to complete actions corresponding to the control order according to the control order.

Figure 10:
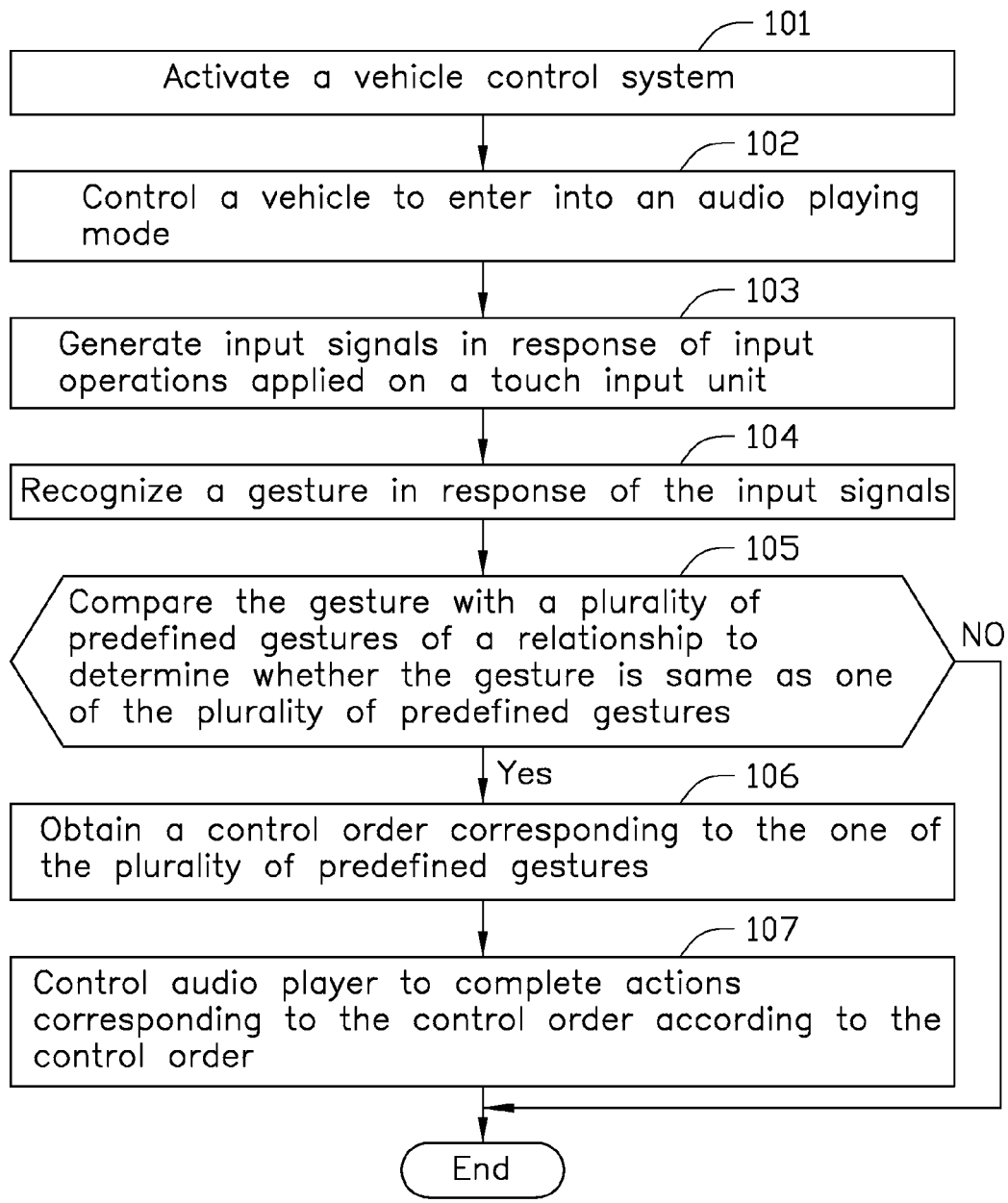
FIG. 10 is a flowchart of an embodiment of an audio control method for controlling the audio playing system.

FIG. 10 illustrates a flowchart of an audio control method for controlling the audio playing system. The audio control method can be mounted within a vehicle. The audio control method is provided by way of example, as there are a variety of ways to carry out the method. The audio control method described below can be carried out using the configurations illustrated in FIG. 3, for example, and various elements of these figures are referenced in explaining the example method. Each block shown in FIG. 10 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, a vehicle control system is activated. A switch unit is pressed to activate the vehicle control system.

At block 102, a mode switching module controls a vehicle to enter into an audio playing mode. A third touch sub-region of a touch input unit is touched such that the audio playing mode is entered into.

At block 103, the touch input unit generates input signals in response to input operations applied on a second touch region of the touch input unit. The input operations can be but not limited to: a slide gesture sliding on the second touch region towards a first direction, a slide gesture sliding on the second touch region towards a second direction, a slide gesture sliding on the second touch region towards a third direction, and/or a slide gesture sliding on the second touch region towards a fourth direction.

At block 104, the input signals are responded to recognize a gesture. A gesture recognizing module recognizes the gesture in response to the input signals.

At block 105, the gesture is compared with a plurality of predefined gestures of a relationship to determine whether the gesture is same as one of the plurality of predefined gestures, if yes, the process goes to block 106, otherwise, the process goes to end. An order obtaining module compares the gesture with the plurality of predefined gestures of the relationship to determine the gesture is same as one of the plurality of predefined gestures, if yes, the process goes to block 106, otherwise, the process goes to end.

At block 106, a control order corresponding to the one of the plurality of predefined gestures is obtained. The order obtaining module obtains the control order corresponding to the one of the plurality of predefined gestures. If the gesture is the slide gesture sliding on the second touch region towards the first direction, the control order is herein configured to control volume of an audio player of the vehicle to increase. If the gesture is the slide gesture sliding on the second touch region towards the second direction, the control order is herein configured to control the volume of the audio player of the vehicle to decrease. If the gesture is the slide gesture sliding on the second touch region towards the third direction, the control order is herein configured to control the audio player of the vehicle to play next song. If the gesture is the slide gesture sliding on the second touch region towards the fourth direction, the control order is herein configured to control the audio player of the vehicle to play previous song.

At block 107, a controlling module controls the audio player to complete actions corresponding to the control order according to the control order.

Figure 11:
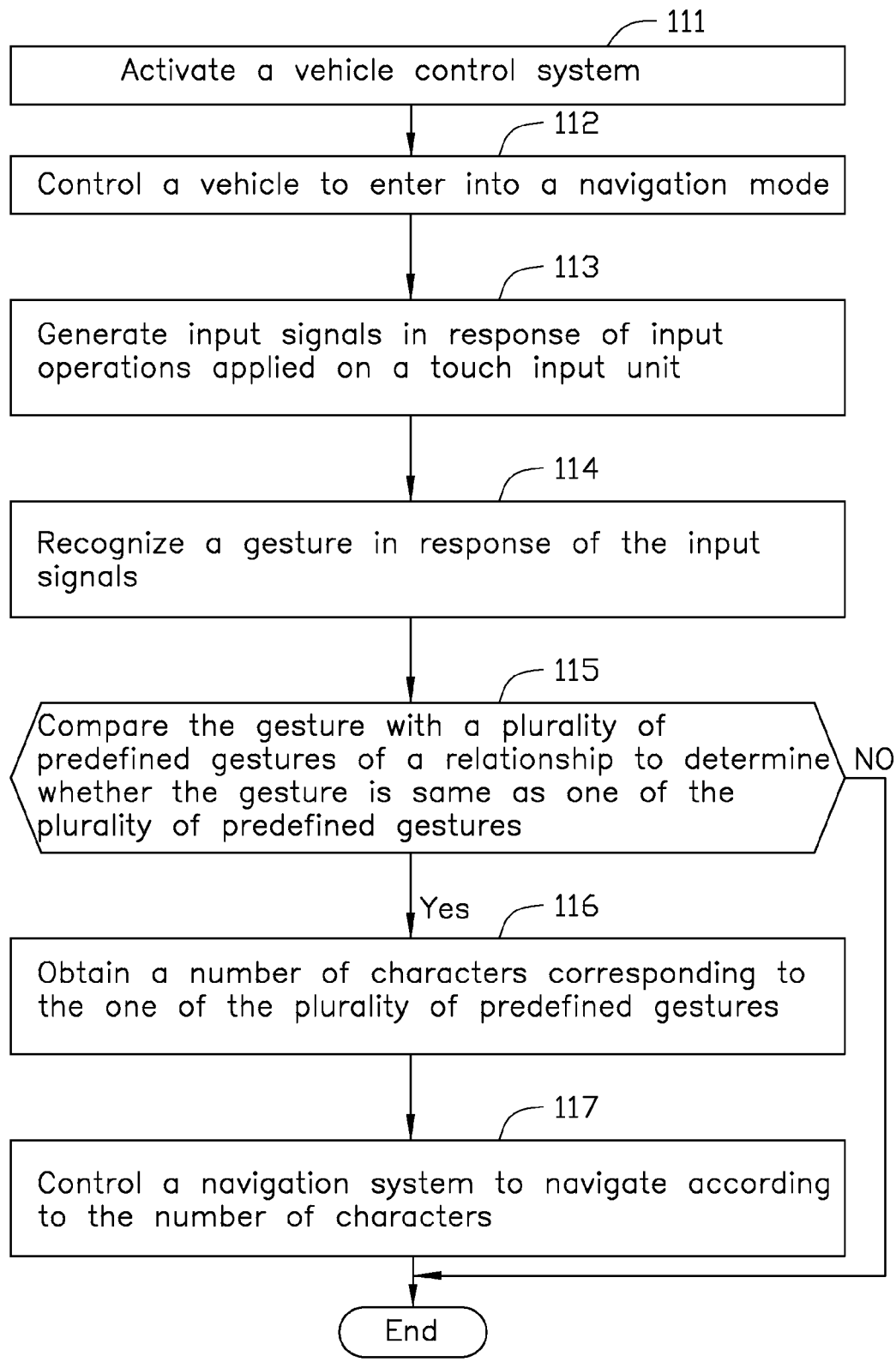
FIG. 11 is a flowchart of an embodiment of a navigation control method for controlling the navigation system.

FIG. 11 illustrates a flowchart of a navigation control method for controlling the navigation system. The navigation control method can be mounted within a vehicle. The navigation control method is provided by way of example, as there are a variety of ways to carry out the method. The navigation control method described below can be carried out using the configurations illustrated in FIG. 3, for example, and various elements of these figures are referenced in explaining the example method. Each block shown in FIG. 11 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 111.

At block 111, a vehicle control system is activated. A switch unit is pressed to activate the vehicle control system.

At block 112, a mode switching module controls a vehicle to enter into a navigation mode. A fourth touch sub-region of a touch input unit is touched such that the navigation mode is entered into.

At block 113, the touch input unit generates input signals in response to input operations applied on a second touch region of the touch input unit. The input operations can be but not limited to a gesture for inputting characters of destination.

At block 114, the input signals are responded to recognize a gesture. A gesture recognizing module recognizes the gesture in response to the input signals.

At block 115, the gesture is compared with a plurality of predefined gestures of a relationship to determine whether the gesture is same as one of the plurality of predefined gestures At block 116, a plurality of characters corresponding to the one of the plurality of predefined gestures is obtained. The order obtaining module obtains the plurality of characters corresponding to the one of the plurality of predefined gestures.

At block 117, a controlling module controls the navigation system to navigate according to the plurality of characters.

The embodiments shown and described above are only examples. Many details are often found in the art such as the other features of audio control system and control method thereof. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An audio control system mounted within a vehicle, the audio control system comprising:
   at least one processing unit;
   a plurality of touch input units coupled to the at least one processing unit, each touch input unit being adjacent to one vehicle window of the vehicle, and further mounted on an inner vehicle door of the vehicle adjacent to the vehicle window; and
   a non-transitory computer readable medium coupled to the at least one processing unit and configured to store instructions for execution by the at least one processing unit, the instructions causing the at least one processing unit to:
      control the vehicle to switch to an audio playing mode in response to input operations applied on one of the plurality of touch input units of the vehicle;
      recognize a gesture in response to input signals, wherein the input signal is generated by the one of the plurality of touch input units in response to input operations applied thereon;
      compare the gesture with a plurality of predefined gestures stored in a storage unit of the vehicle;
      determine whether the gesture is the same as one of the plurality of predefined gestures;
      obtain a control order corresponding to the one of the plurality of predefined gestures when the gesture matches the one of the plurality of predefined gestures, wherein when the gesture is recognized to be a touch gesture sliding in the one of the plurality of touch input units towards a first direction, the control order generated is one that controls a volume of an audio player of the vehicle to increase, and when the gesture is recognized to be a touch gesture sliding in the one of the plurality of touch input units towards a second direction opposite to the first direction, the control order generated is one that controls the volume of the audio player of the vehicle to decrease; and
      control the volume of the audio player of the vehicle to increase or decrease according to the control order.

2. The audio control system of claim 1, wherein when the gesture is recognized to be a slide gesture sliding in the one of the plurality of touch input units towards a third direction, the control order generated is one that controls the audio player to play next song, when the gesture is recognized to be a slide gesture sliding in the one of the plurality of touch input units towards a fourth direction, the control order generated is one that controls the audio player to play previous song, and the instructions cause the at least one processing unit to control the audio player of the vehicle to play the next song or the previous song according to the control order.

3. The audio control system of claim 1, wherein the instructions cause the at least one processing unit to control the volume of the audio player of the vehicle to increase following the sliding gesture which is applied on the one of the plurality of touch input units and sliding towards the first direction, and decrease following the siding gesture which is applied on the one of the plurality of touch input units and sliding towards the second direction, and further stop to increase or decrease when the sliding gesture stops.

4. The audio control system of claim 1, wherein the instructions cause the at least one processing unit to control the vehicle to switch to an air conditioning mode in response to the input operations applied on the one of the plurality of touch input units of the vehicle;
   wherein when the vehicle is in the air conditioning mode and the gesture is recognized to be the touch gesture sliding in the one of the plurality of touch input units towards the first direction, the control order generated is one that controls a temperature of an air conditioner of the vehicle to increase;
   wherein when the vehicle is in the air conditioning mode, and the gesture is recognized to be the touch gesture sliding in the one of the plurality of touch input units towards the second direction, the control order generated is one that controls the temperature of the air conditioner of the vehicle to decrease; and
   wherein the instructions cause the at least one processing unit to control the temperature of the air conditioner of the vehicle to increase or decrease according to the control order.

5. The audio control system of claim 4, wherein the instructions cause the at least one processing unit to control the temperature of the air conditioner of the vehicle to increase following the siding gesture applied on the one of the plurality of touch input units and sliding towards the first direction, and decrease following the siding gesture applied on the one of the plurality of touch input units and sliding towards the second direction, and further stop to increase or decrease when the slide gesture stops.

6. The audio control system of claim 1, wherein the instructions cause the at least one processing unit to control the vehicle to switch to a window adjusting mode in response to input operations applied on the one of the plurality of touch input units of the vehicle;
   wherein when the vehicle is in the window adjusting mode, and the gesture is recognized to be the touch gesture sliding in the one of the plurality of touch input units towards the first direction, the control order generated is one that controls one or more vehicle windows of the vehicle to rise;
   wherein when the vehicle is in the window adjusting mode, and the gesture is recognized to be the touch gesture sliding in the one of the plurality of touch input units towards the second direction, the control order generated is one that controls the one or more vehicle windows of the vehicle to go down; and
   wherein the instructions cause the at least one processing unit to control the one or more vehicle windows of the vehicle to rise or go down according to the control order.

7. The audio control system of claim 6, wherein the instructions cause the at least one processing unit to control the one or more vehicle windows of the vehicle to rise following the siding gesture which is applied on the one of the plurality of touch input units and sliding towards the first direction, and go down following the siding gesture which is applied on the one of the plurality of touch input units and sliding towards the second direction, and further stop to rise or go down when the slide gesture is stopped.

8. An audio control method comprising:
   controlling a vehicle to switch to an audio playing mode in response to input operations applied on one of a plurality of touch input units of a vehicle, wherein each touch input unit is adjacent to one vehicle window of the vehicle, and further mounted on an inner vehicle door of the vehicle adjacent to the vehicle window;
   recognizing a gesture in response to input signals, wherein the input signal is generated by the one of the plurality of touch input units of the vehicle in response to input operations applied thereon;

comparing the gesture with a plurality of predefined gestures stored in a storage unit of the vehicle;

determining whether the gesture is same as one of the plurality of predefined gestures;

obtaining a control order corresponding to the one of the plurality of predefined gestures when the gesture matches the one of the plurality of predefined gestures, wherein when the gesture is recognized to be a touch gesture sliding in the one of the plurality of touch input units towards a first direction, the control order generated is one that controls a volume of an audio player of the vehicle to increase, when the gesture is recognized to be a touch gesture sliding in the one of the plurality of touch input units towards a second direction opposite to the first direction, the control order generated is one that controls the volume of the audio player of the vehicle to decrease; and controlling the volume of the audio player of the vehicle to increase or decrease according to the control order.

9. The audio control method of claim 8, wherein after controlling the volume of the audio player of the vehicle to increase or decrease according to the control order, the audio control method further comprises:

when the gesture is recognized to be a slide gesture sliding in the one of the plurality of touch input units towards a third direction, controlling the audio player to play next song; and when the gesture is recognized to be a slide gesture sliding in the one of the plurality of touch input units towards a fourth direction, controlling the audio player to play previous song.

10. The control method of claim 8, wherein after controlling the volume of the audio player of the vehicle to increase or decrease according to the control order, the audio control method further comprises:

the volume of the audio player of the vehicle rising following the siding gesture which is applied on the one of the plurality of touch input units and sliding towards the first direction;

the volume of the audio player of the vehicle going down following the siding gesture which is applied on the one of the plurality of touch input units and sliding towards the second direction; and the volume of the audio player of the vehicle stopping to rise or go down when the slide gesture is stopped.

11. The audio control method of claim 8, wherein the audio control method further comprises:

controlling the vehicle to switch to an air conditioning mode in response to the input operations applied on the one of the plurality of touch input units of the vehicle;

when the vehicle is in the air conditioning mode, and the gesture is recognized to be the touch gesture sliding in the one of the plurality of touch input units towards the first direction, controlling a temperature of an air conditioner of the vehicle to increase; and when the vehicle is in the air conditioning mode, and the gesture is recognized to be the touch gesture sliding in the one of the plurality of touch input units towards the second direction, controlling the temperature of the air conditioner of the vehicle to decrease.

12. The audio control method of claim 11, wherein after controlling the temperature of the air conditioner of the vehicle to increase or decrease according to the control order, the audio control method further comprises:

the temperature of the air conditioner of the vehicle rising following the siding gesture which is applied on the one of the plurality of touch input units and sliding towards the first direction;

the temperature of the air conditioner of the vehicle going down following the siding gesture which is applied on the one of the plurality of touch input units and sliding towards the second direction; and the temperature of the air conditioner of the vehicle stopping to rise or go down when the slide gesture is stopped.

13. The audio control method of claim 8, wherein the audio control method further comprises:

controlling the vehicle to switch to a window adjusting mode in response to the input operations applied on the one of the plurality of touch input units of the vehicle;

when the vehicle is in the window adjusting mode, and the gesture is recognized to be the touch gesture sliding in the one of the plurality of touch input units towards the first direction, controlling one or more vehicle windows of the vehicle to rise; and when the vehicle is in the window adjusting mode, and the gesture is recognized to be the touch gesture sliding in the one of the plurality of touch input units towards the second direction, controlling the one or more vehicle windows of the vehicle to go down.

14. The audio control method of claim 13, wherein after controlling the one or more vehicle windows of the vehicle to rise or go down according to the control order, the audio control method further comprises:

the one or more vehicle windows of the vehicle rising following the siding gesture which is applied on the one of the plurality of touch input units and sliding towards the first direction;

the one or more vehicle windows of the vehicle going down following the siding gesture which is applied on the one of the plurality of touch input units and sliding towards the second direction; and the one or more vehicle windows of the vehicle stopping to rise or go down when the slide gesture is stopped.

15. A non-transitory storage medium having stored thereon instructions that, when executed by at least one processing unit of a vehicle, causes the least one processor to execute instructions of an audio control method, the audio control method comprising:

controlling the vehicle to switch to an audio playing mode in response to input operations applied on one of a plurality of touch input units of a vehicle, wherein each touch input unit is adjacent to one vehicle window of the vehicle, and further mounted on an inner vehicle door of the vehicle adjacent to the vehicle window;

recognizing a gesture in response to input signals, wherein the input signal is generated by the one of the plurality of touch input units of the vehicle in response to input operations applied thereon;

comparing the gesture with a plurality of predefined gestures stored in a storage unit of the vehicle;

determining whether the gesture is same as one of the plurality of predefined gestures;

obtaining a control order corresponding to the one of the plurality of predefined gestures when the gesture matches the one of the plurality of predefined gestures, wherein when the gesture is recognized to be a touch gesture sliding in the one of the plurality of touch input units towards a first direction, the control order generated is one that controls a volume of an audio player of the vehicle to increase, when the gesture is recognized to be a touch gesture sliding in the one of the plurality of touch input units towards a second direction opposite to the first direction, the control order generated is one that controls the volume of the audio player of the vehicle to decrease; and controlling the volume of the audio player of the vehicle to increase or decrease according to the control order.

16. The non-transitory storage medium of claim 15, wherein after controlling the volume of the audio player of the vehicle to increase or decrease according to the control order, the audio control method further comprises:

when the gesture is recognized to be a slide gesture sliding in the one of the plurality of touch input units towards a third direction, controlling the audio player to play next song; and when the gesture is recognized to be a slide gesture sliding in the one of the plurality of touch input units towards a fourth direction, controlling the audio player to play previous song.

17. The non-transitory storage medium of claim 15, wherein after controlling the volume of the audio player of the vehicle to increase or decrease according to the control order, the audio control method further comprises:

the volume of the audio player of the vehicle rising following the siding gesture which is applied on the one of the plurality of touch input units and sliding towards the first direction;

the volume of the audio player of the vehicle going down following the siding gesture which is applied on the one of the plurality of touch input units and sliding towards the second direction; and the volume of the audio player of the vehicle stopping to rise or go down when the slide gesture is stopped.

18. The non-transitory storage medium of claim 15, wherein the audio control method further comprises:

controlling the vehicle to switch to an air conditioning mode in response to the input operations applied on the one of the plurality of touch input units of the vehicle;

when the vehicle is in the air conditioning mode, and the gesture is recognized to be the touch gesture sliding in the one of the plurality of touch input units towards the first direction, controlling a temperature of an air conditioner of the vehicle to increase; and when the vehicle is in the air conditioning mode, and the gesture is recognized to be the touch gesture sliding in the one of the plurality of touch input units towards the second direction, controlling the temperature of the air conditioner of the vehicle to decrease.

19. The non-transitory storage medium of claim 18, wherein after controlling the temperature of the air conditioner of the vehicle to increase or decrease according to the control order, the audio control method further comprises:

the temperature of the air conditioner of the vehicle rising following the siding gesture which is applied on the one of the plurality of touch input units and sliding towards the first direction;

the temperature of the air conditioner of the vehicle going down following the siding gesture which is applied on the one of the plurality of touch input units and sliding towards the second direction; and the temperature of the air conditioner of the vehicle stopping to increase or decrease when the slide gesture is stopped.

20. The non-transitory storage medium of claim 15, wherein the audio control method further comprises:

controlling the vehicle to switch to a window adjusting mode in response to the input operations applied on the one of the plurality of touch input units of the vehicle;

when the vehicle is in the window adjusting mode, and the gesture is recognized to be the touch gesture sliding in the one of the plurality of touch input units towards the first direction, controlling one or more vehicle windows of the vehicle to rise; and when the vehicle is in the window adjusting mode, and the gesture is recognized to be the touch gesture sliding in the touch input unit towards the second direction, controlling the one or more vehicle windows of the vehicle to go down.

* * * * *